(12) United States Patent
Meng et al.

(10) Patent No.: US 12,183,362 B1
(45) Date of Patent: Dec. 31, 2024

(54) SPEECH RECOGNITION

(71) Applicant: MASHANG CONSUMER FINANCE CO., LTD., Chongqing (CN)

(72) Inventors: Qinglin Meng, Chongqing (CN); Bin Yang, Chongqing (CN); Ning Jiang, Chongqing (CN); Haiying Wu, Chongqing (CN); Quan Lu, Chongqing (CN); Min Liu, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 0 days.

(21) Appl. No.: 18/633,370

(22) Filed: Apr. 11, 2024

(30) Foreign Application Priority Data

Jul. 20, 2023 (CN) .......................... 202310898386.1

(51) Int. Cl.
| | | |
|---|---|---|
| *G10L 15/00* | (2013.01) | |
| *G10L 15/02* | (2006.01) | |
| *G10L 15/04* | (2013.01) | |
| *G10L 15/22* | (2006.01) | |
| *G10L 25/78* | (2013.01) | |
| *G10L 15/08* | (2006.01) | |

(52) U.S. Cl.
CPC .............. *G10L 25/78* (2013.01); *G10L 15/02* (2013.01); *G10L 15/04* (2013.01); *G10L 15/22* (2013.01); *G10L 15/08* (2013.01)

(58) Field of Classification Search
CPC ....... G10L 15/16; G10L 19/005; G10L 19/00; G10L 25/27; G10L 25/30; G10L 15/02; G10L 15/063; G10L 15/08; G10L 15/07; G10L 15/20; G10L 15/22; G10L 15/26; G10L 15/30; G10L 15/12; G10L 25/78; G10L 25/87; G10L 21/0208; G10L 17/00; G10L 17/02; G10L 17/04; G10L 17/06; G10L 15/10; G10L 15/04; G10L 15/14; G10L 15/197; G10L 15/1815; G10L 15/1822; G10L 15/183; G10L 15/193; G10L 15/19; G06F 40/44; G06F 40/47; G06F 40/55
See application file for complete search history.

(56) References Cited

U.S. PATENT DOCUMENTS

| | | | |
|---|---|---|---|
| 9,875,743 B2* | 1/2018 | Gorodetski | ............. G10L 17/04 |
| 10,592,611 B2* | 3/2020 | Vig | ........................ G06F 40/284 |
| 10,706,873 B2* | 7/2020 | Tsiartas | ............... G10L 15/1822 |

* cited by examiner

*Primary Examiner* — Vu B Hang
(74) *Attorney, Agent, or Firm* — PV IP PC; Wei Te Chung

(57) ABSTRACT

A speech recognition method. The method includes: performing speech activity detection on speech data to obtain multiple speech segments; determining, for each of the speech segments, a number of speakers involved in the each of the speech segments; for each of at least one of the speech segments with the determined number greater than 1: performing speech separation on the each of at least one of the speech segments to obtain multiple audio segments; performing speech recognition on each of the audio segments to obtain respective first speech recognition results for the audio segments; performing feature extraction on each of the audio segments to obtain respective voiceprint feature vectors; and performing clustering on the audio segments with respect to the speakers to obtain a clustering result; and obtaining a second speech recognition result for the speech data based on the clustering result and the respective first speech recognition results.

20 Claims, 8 Drawing Sheets

SPEECH RECOGNITION

CROSS-REFERENCE TO RELATED APPLICATION

This application claims priority to Chinese Patent Application No. 202310898386.1, filed on Jul. 20, 2023, the disclosure of which is incorporated herein by reference in its entirety.

TECHNICAL FIELD

The present disclosure relates to artificial intelligence technologies, and more particularly, to speech recognition.

BACKGROUND

In a multi-speaker and multi-channel speech recognition application scenario, such as a conference, a multi-person conversation customer service or the like, it is generally desirable to recognize both respective speakers and respective speeches and texts corresponding thereto of the speakers. In the communication and conversation section of a conference, the voices of different speakers are likely to overlap. However, the conventional single-channel speech recognition method cannot recognize respective voices of multiple speakers, especially the overlapping parts of the voices. Therefore, there is a need to develop a multi-channel and multi-speaker speech recognition method.

SUMMARY

According to one or more embodiments of the present disclosure, A speech recognition method, comprising: performing speech activity detection on speech data to obtain a plurality of speech segments; determining, for each of the plurality of speech segments, a number of speakers involved in the each of the plurality of speech segments; for each of at least one of the plurality of speech segments with the determined number of speakers greater than 1: performing speech separation on the each of at least one of the plurality of speech segments to obtain a plurality of audio segments; performing speech recognition on each of the plurality of audio segments to obtain respective first speech recognition results for the plurality of audio segments; performing feature extraction on each of the plurality of audio segments to obtain respective voiceprint feature vectors of the plurality of audio segments; and performing clustering on the plurality of audio segments with respect to the speakers based on the respective voiceprint feature vectors to obtain a clustering result indicating that each of the speakers corresponds to which of the plurality of audio segments; and obtaining a second speech recognition result for the speech data based on the clustering result and the respective first speech recognition results for the each of at least one of the plurality of speech segments.

According to one or more embodiments of the present disclosure, an speech recognition apparatus includes: a processor; and a memory storing an application program executable by the processor to perform operations including: performing speech activity detection on speech data to obtain a plurality of speech segments; determining, for each of the plurality of speech segments, a number of speakers involved in the each of the plurality of speech segments; for each of at least one of the plurality of speech segments with the determined number of speakers greater than 1: performing speech separation on the each of at least one of the plurality of speech segments to obtain a plurality of audio segments; performing speech recognition on each of the plurality of audio segments to obtain respective first speech recognition results for the plurality of audio segments; performing feature extraction on each of the plurality of audio segments to obtain respective voiceprint feature vectors of the plurality of audio segments; and performing clustering on the plurality of audio segments with respect to the speakers based on the respective voiceprint feature vectors to obtain a clustering result indicating that each of the speakers corresponds to which of the plurality of audio segments; and obtaining a second speech recognition result for the speech data based on the clustering result and the respective first speech recognition results for the each of at least one of the plurality of speech segments.

According to one or more embodiments of the present disclosure, a computer-readable storage medium stores a plurality of instructions executable by a processor to perform the above speech recognition method.

DETAILED DESCRIPTION

In order that the technical solution of the present disclosure may be better understood by those of ordinary skill in the art, exemplary embodiments of the present disclosure will now be described in conjunction with the accompanying drawings, in which various details of the embodiments of the present disclosure are included to facilitate understanding, and are to be considered as exemplary only. Accordingly, those of ordinary skill in the art will recognize that various changes and modifications may be made to the embodiments described herein without departing from the scope and spirit of the present disclosure. Also, for clarity and conciseness, details of well-known functions and structures are omitted in the following description.

Without conflict, the various embodiments and features in the embodiments disclosed herein may be combined with each other.

As used herein, the term "and/or" includes any and all combinations of one or more related listed entries.

The terms used herein is for the purpose of describing particular embodiments only and is not intended to limit the present disclosure. As used herein, the singular forms "a", "an", and "the" are also intended to include the plural forms unless the context clearly dictates otherwise. It will also be understood that when the terms "comprising" and/or "made of" are used in the specification, the presence of the features, integers, steps, operations, elements, and/or components is specified, but the presence or addition of one or more other features, integers, steps, operations, elements, components, and/or groups thereof is not excluded. "Connected" and the like are not limited to physical or mechanical connections, but may include electrical connections, whether direct or indirect.

Unless limited otherwise, all terms (including technical and scientific terms) used herein have the same meaning as commonly understood by those of ordinary skill in the art. It will also be understood that terms such as those defined in commonly used dictionaries should be interpreted to have a meaning consistent with their meanings in the context of the related art and the present disclosure, and will not be interpreted to have an idealized or overly formal meaning unless expressly so defined herein.

In a multi-person conversation scenario (such as a conference or a multi-person conversation customer service), speech data obtained by a transcription device is multi-channel speech data. In a speech recognition process, it is not only necessary to recognize the speaker, but also to recognize the corresponding speech of each speaker. During the conversation, the voices of different speakers are prone to overlap with each other. However, the general single-channel speech recognition method mainly focus on the speech data of single-channel and multiple-speaker, which cannot recognize the speech data of multiple-channel and multiple-speaker.

Figure 1:
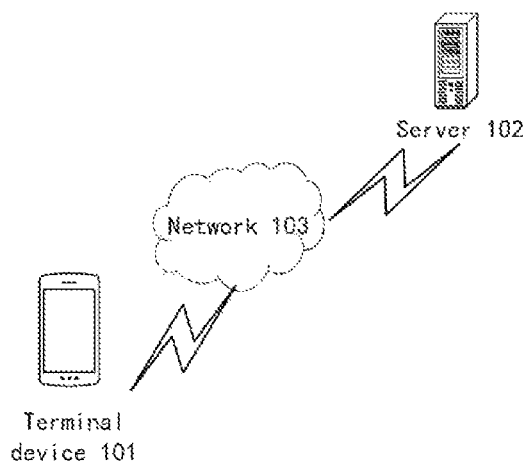
FIG. 1 schematically illustrates a scenario where a speech recognition method according to one or more embodiments of the present disclosure can be applied.

FIG. 1 schematically illustrates a scenario where a speech recognition method according to one or more embodiments of the present disclosure can be applied.

As shown in FIG. 1, an application scenario of one or more embodiments of the present disclosure may include a terminal device 101, a network 103, and a server 102. The network 103 serves as a medium for providing a communication link between the terminal device 101 and the server 102. The network 103 may include various types of connections, such as wired communication links, wireless communication links, or fiber optic cables, etc.

The user may interact with the server 102 through the network 103 using the terminal device 101 to receive or transmit messages, etc. Various communication client applications, such as shopping applications, web browser applications, search applications, instant messaging tools, mailbox clients, social platform software, and the like (examples only) may be installed on the terminal device 101.

The terminal device 101 may be various electronic devices having a display screen and supporting web page browsing, including, but not limited to, a smartphone, a tablet computer, a laptop computer, a desktop computer, and the like.

The server 102 may be a server that provides various services, such as a background management server (examples only) that supports a website that a user browses using the terminal device 101. The background management server may analyze and process the received data such as a user request, and feed back the processing result (for example, a web page, information, or data obtained or generated according to the user request) to the terminal device.

It should be noted that the speech recognition method and apparatus according to one or embodiments of the present disclosure may be performed by the server 102. Accordingly, the speech recognition method and apparatus according to one or more embodiments of the present disclosure may be provided in the server 102. The speech recognition method and apparatus according to one or more embodiments of the present disclosure may also be performed by a server or cluster of servers that is different from the server 102 and capable of communicating with the terminal device 101 and/or the server 102. Accordingly, the speech recognition method and apparatus according to one or more embodiments of the present disclosure may also be provided in a server or server cluster that is different from the server 102 and capable of communicating with the terminal device 101 and/or the server 102.

It should be understood that the number of terminal devices, networks and servers in FIG. 1 is merely illustrative. According to implementation requirements, there may be any number of terminal devices, networks, and servers.

Figure 2:
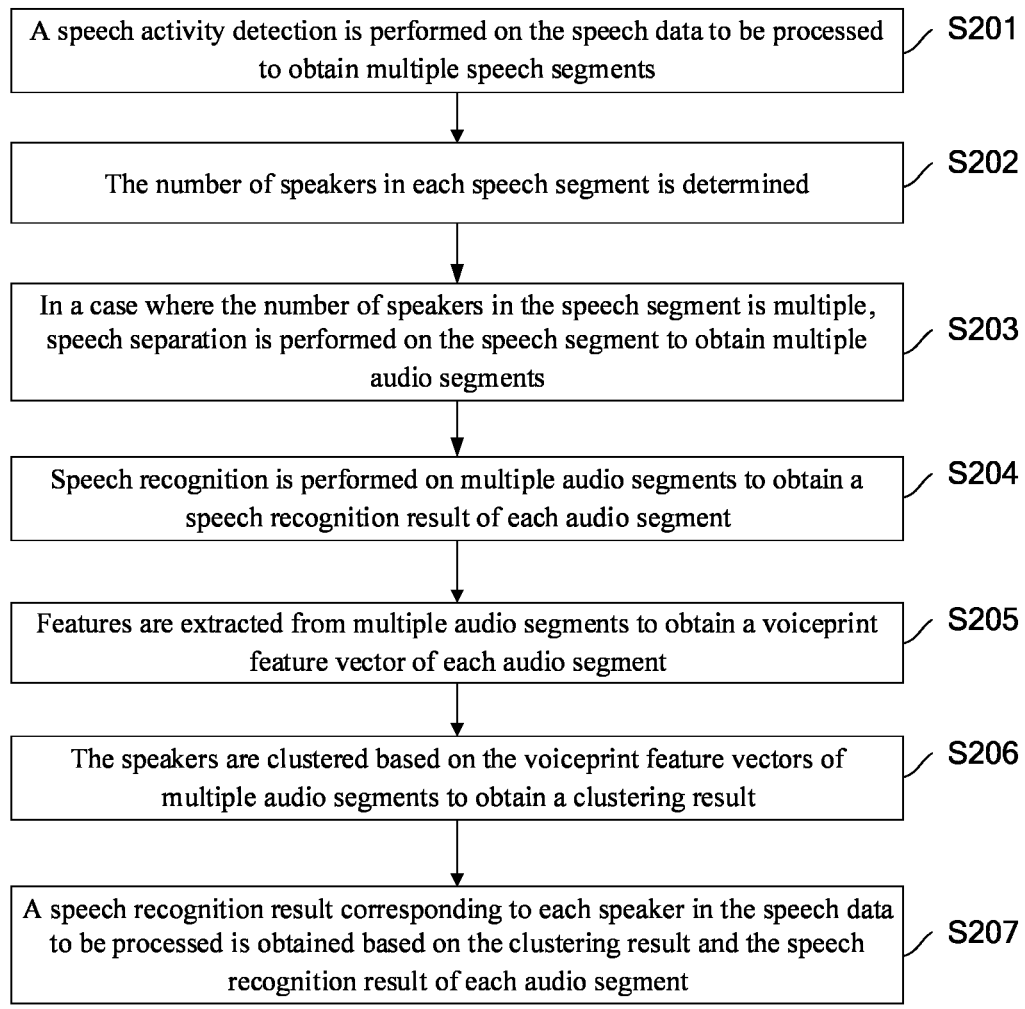
FIG. 2 is a flowchart of a speech recognition method according to one or more embodiments of the present disclosure.

FIG. 2 is a flowchart of a speech recognition method according to one or more embodiments of the present disclosure. Referring to FIG. 2, the method includes steps S201 to S207.

At step S201, a speech activity detection is performed on the speech data to obtain multiple speech segments.

The speech data may be speech data in a multiple-microphone and multiple-speaker conference scenario. The speech activity detection may be an on-line detection or an off-line detection.

The speech activity detection may determine whether there is a speech activity (voice of a speaker) in the speech data, remove a speech segment without speech activity, retain only a speech segment with speech activity, and divide the speech data into multiple speech segments after the speech segment without speech activity is removed. According to one or more embodiments of the present disclosure, the manner in which the speech activity is detected is not limited.

At step S202, the number of speakers in each speech segment is determined.

Each speech segment is processed to determine the number of speakers in each speech segment. In each speech segment, there may be one speaker or multiple speakers.

Figure 3:
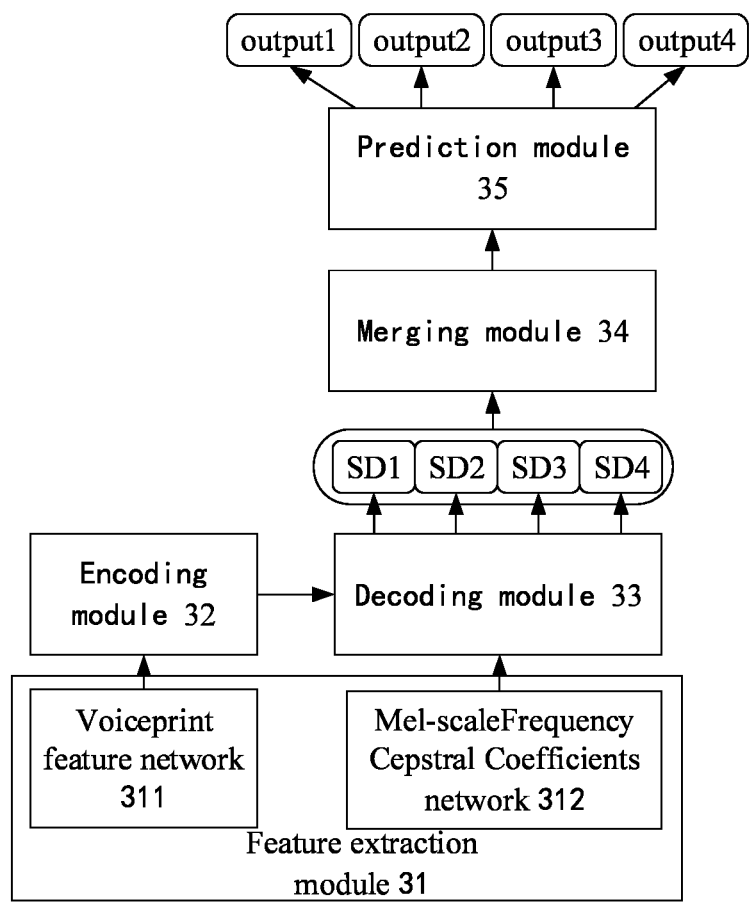
FIG. 3 is a schematic block diagram of a speaker division model according to one or more embodiments of the present disclosure.

In one or more embodiments of the present disclosure, a speaker division model is used to determine the number of speakers in each speech segment. FIG. 3 is a schematic block diagram of a speaker division model according to one or more embodiments of the present disclosure. As shown in FIG. 3, the speaker division model includes a feature extraction module 31, an encoding module 32, a decoding module 33, a merging module 34, and a prediction module 35.

In one or more embodiments of the present disclosure, the feature extraction module 31 is configured to extract a voiceprint feature of a speech segment and a Mel-scale Frequency Cepstral Coefficients feature. The feature extraction module 31 includes a voiceprint feature network 311 and a Mel-scale Frequency Cepstral Coefficients network 312. The voiceprint feature network 311 is configured to extract voiceprint feature of the speech segment. Each speech segment is inputted to a voiceprint feature network, and the voiceprint feature network outputs a voiceprint feature vector (x-vector) corresponding to each speech segment. According to one or more embodiments of the present disclosure, the voiceprint feature network is not limited. For example, the voiceprint feature network includes any one of a CAM++ network and a ResNet network.

The Mel-scale Frequency Cepstral Coefficients network 312 is configured to extract the Mel-scale Frequency Cepstral Coefficients (MFCC) feature. Each speech segment is inputted to the Mel-scale Frequency Cepstral Coefficients network to obtain the MFCC feature.

In one or more embodiments of the present disclosure, the encoding module 32 is configured to encode the Mel-scale Frequency Cepstral Coefficients feature to obtain encoded feature vector. The encoding module 32 includes a convolution-augmented self-attention neural network, for example a Conformer network. The Conformer network may combine a Transformer network with a Convolutional Neural Network (CNN). The Transformer network is good at capturing content-based global interaction information, while the CNN network can effectively capture local features. Thus, the Conformer network may model both long-term global interaction information and local features well. According to one or more embodiments of the present disclosure, the encoding module 32 may include a multilayer Conformer network, such as a 4-layer Conformer network.

In one or more embodiments of the present disclosure, the decoding module 33 is configured to decode the encoded feature vector to obtain a decoded feature vector. The decoding module 33 includes a self-attention neural network. According to one or more embodiments of the present disclosure, the self-attention neural network is not limited. For example, the self-attention neural network may include a Transformer network, which can effectively encode the timing information, has a better processing capability of the timing information than that of a Long Short-Term Memory (LSTM) network, and has a high processing speed.

In one or more embodiments of the present disclosure, the merging module 34 is configured to merge the decoded feature vector and the voiceprint feature vector to obtain a prediction feature vector. The merging module 34 may use a Merge algorithm to merge the decoded feature vector and the voiceprint feature vector to obtain a prediction feature vector. The prediction feature vector is a prediction vector used to represent a speaker feature, and the number of speakers can be determined based on the prediction vector.

In one or more embodiments of the present disclosure, the prediction module 35 is configured to predict the number of speakers in each speech segment based on the prediction feature vector to obtain the number of speakers in each speech segment. The prediction module 35 includes a Long Short-Term Memory (LSTM) network.

Figure 4:
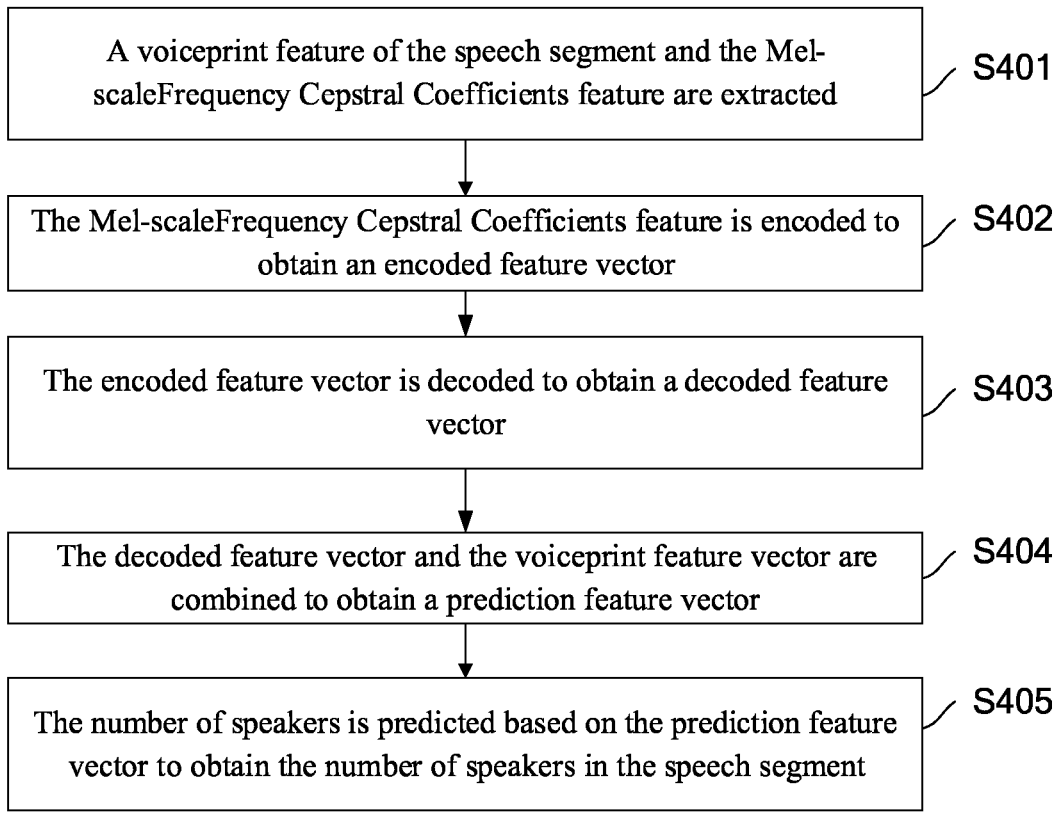
FIG. 4 is a flowchart of a process of determining the number of speakers according to one or more embodiments of the present disclosure.

FIG. 4 is a flowchart of a process of determining the number of speakers according to one or more embodiments of the present disclosure. As shown in FIG. 4, the method for determining the number of speakers includes steps S401 to S404.

At step S401, the voiceprint feature of the speech segment and the Mel-scale Frequency Cepstral Coefficients feature are extracted.

The voiceprint feature of the speech segment is extracted by a voiceprint feature network, and the Mel-scale Frequency Cepstral Coefficients feature is extracted by a Mel-scale Frequency Cepstral Coefficients network.

At step S402, the Mel-scale Frequency Cepstral Coefficients feature is encoded to obtain an encoded feature vector.

The Mel-scale Frequency Cepstral Coefficients feature is encoded by the encoding module to obtain the encoded feature vector. The specific structure and function of the encoding module may refer to the description corresponding to FIG. 3, which is not described herein.

At step S403, the encoded feature vector is decoded to obtain a decoded feature vector.

The encoded feature vector is decoded by the decoding module to obtain the decoded feature vector. The specific structure and function of the decoding module may refer to the description corresponding to FIG. 3, which is not described herein.

At step S404, the decoded feature vector and the voiceprint feature vector are merged to obtain a prediction feature vector.

The decoded feature vector and the voiceprint feature vector is merged by the merging module to obtain the prediction feature vector. The specific structure and function of the merging module may refer to the description corresponding to FIG. 3, which is not described herein.

At Step S405, the number of speakers is predicted based on the prediction feature vector to obtain the number of speakers in the speech segment.

The number of speakers is predicted by the prediction module based on the prediction feature vector to obtain the number of speakers in the speech segment. The specific structure and function of the prediction module may refer to the description corresponding to FIG. 3, which is not described herein.

Figure 11:
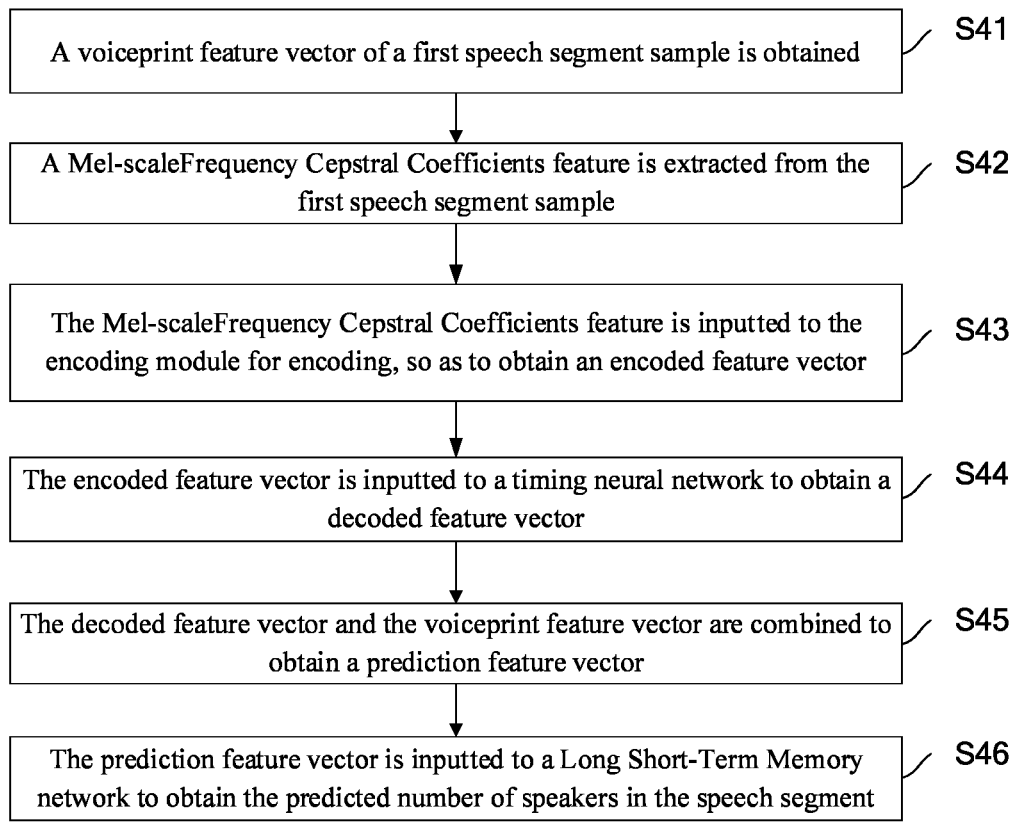
FIG. 11 is a flowchart of a process of obtaining a speaker division model according to one or more embodiments of the present disclosure.

The speaker division model may be obtained by steps S41 to S46 as shown in FIG. 11.

At Step S41, a voiceprint feature vector of a first speech segment sample is obtained. The first speech segment sample is a speech segment annotated with the number of speakers.

There may be one or more speakers in the first speech segment sample. Since the voiceprint character of each speaker is different, different speakers may be distinguished based on the voiceprint feature vector.

According to one or more embodiments of the present disclosure, the method for obtaining the voiceprint feature vector of the first speech segment sample is not limited. For example, the voiceprint feature vector of the first speech segment sample is obtained by a context-aware masking CAM++ model, that is, the first speech segment sample is inputted to the CAM++ model, and the voiceprint feature vector (x-vector) of the first speech segment sample is outputted by the CAM++ model. The CAM++ model may be obtained by training a large number of samples, or may use a trained model.

For example, the first speech segment sample obtains four voiceprint vectors, vector v1, vector v2, vector v3, and vector v4.

At step S42, a Mel-scale Frequency Cepstral Coefficients feature is extracted from the first speech segment sample.

In one or more embodiments of the present disclosure, the Mel-scale Frequency Cepstral Coefficients feature is extracted from a first speech segment sample by a Mel-scale Frequency Cepstral Coefficients network.

At step S43, the Mel-scale Frequency Cepstral Coefficients feature is inputted to the encoding module for encoding, so as to obtain an encoded feature vector.

There is a 4-layer Conformer network in the coding module. the Mel-scale Frequency Cepstral Coefficients feature is inputted to the 4-layer Conformer network to obtain the encoded feature vector.

At Step S44, the encoded feature vector is inputted to a timing neural network to obtain a decoded feature vector.

In the decoding module, the decoded feature vector is obtained by inputting the encoded feature vector to a two-layer Transformer network.

At step S45, the decoded feature vector and each of the voiceprint feature vectors are merged to obtain a prediction feature vector.

According to one or more embodiments of the present disclosure, the decoded feature vector may be merged respectively with multiple voiceprint feature vectors by a matrix multiplication to obtain multiple prediction feature vectors.

The decoded feature vector obtained at step S44 is merged respectively with the voiceprint feature vectors obtained at step S41, for example, vector v1, vector v2, vector v3, and vector v4 by a Merge algorithm. For example, the decoded feature vector is merged with vector v1 to obtain a first prediction feature vector SD1, the decoded feature vector is merged with vector v2 to obtain a second prediction feature vector SD2, the decoded feature vector is merged with vector v3 to obtain a third prediction feature vector SD3, and the decoded feature vector is merged with vector v4 to obtain a fourth prediction feature vector SD4.

At step S46, the prediction feature vector is inputted to a Long Short-Term Memory network to obtain the predicted number of speakers in the speech segment.

The prediction feature vectors SD1, SD2, SD3, and SD4 are inputted to the Long Short-Term Memory network, and the prediction feature vectors SD1, SD2, SD3, and SD4 are merged and mapped by the Long Short-Term Memory network to output predicted numbers output1, output2, output3, and output4.

When a difference between the predicted number of speakers and the annotated number of speakers is within a preset difference threshold range, a speaker division model is obtained.

At step S203, in a case where the number of speakers in the speech segment is multiple, speech separation is performed on the speech segment to obtain multiple audio segments.

In a case where the number of speakers in the speech segment is one, the speech segment in which the number of speakers is one is used as the audio segment, and each audio segment corresponds to one speaker.

There may be one or more speakers in each speech segment. When it is determined that there is only one speaker in the speech segment, the speech segment is used as the audio segment. When it is determined that there are multiple speakers in the speech segment, speech separation is performed on each speech segment to obtain multiple audio segments so that each audio segment corresponds to one speaker.

In one or more embodiments of the present disclosure, speech separation is performed on the speech segment in which the number of speakers is multiple by a speech separation model to obtain multiple audio segments.

Figure 5:
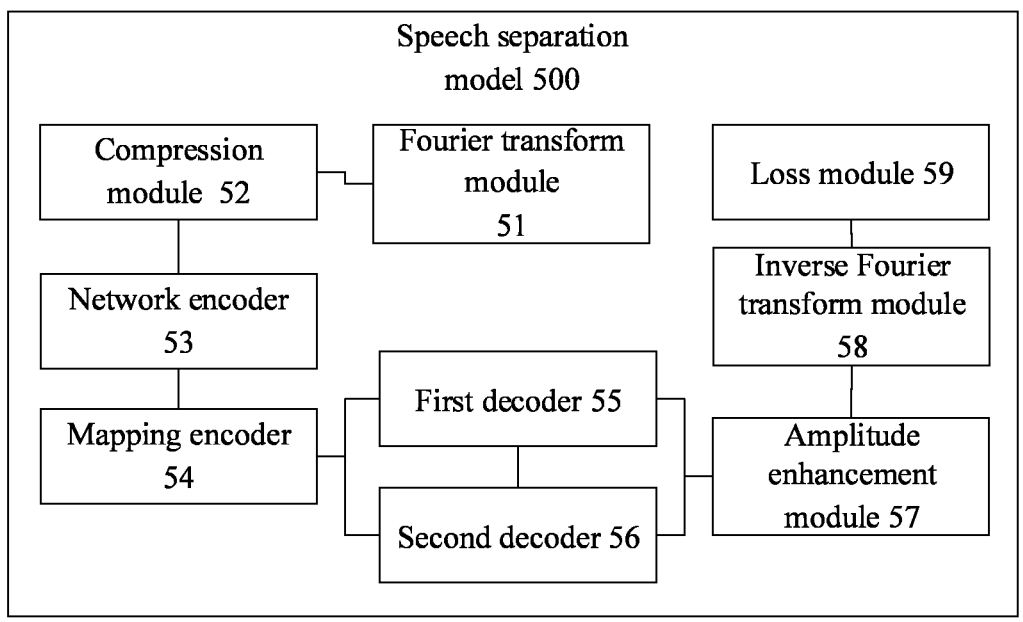
FIG. 5 is a block diagram of a speech separation model according to one or more embodiments of the present disclosure.

FIG. 5 is a block diagram of a speech separation model according to one or more embodiments of the present disclosure. As shown in FIG. 5, the speech separation model 500 includes a Fourier transform module 51, a compression module 52, a network encoder 53, a mapping encoder 54, a first decoder 55, a second decoder 56, an amplitude enhancement module 57, an inverse Fourier transform module 58, and a loss module 59. The Fourier transform module 51 is configured to perform a short-time Fourier transform on an input second speech segment sample to obtain a complex spectrum. The compression module 52 is configured to perform a power-law compression on an input complex spectrum to obtain a spectrogram. The network encoder 53 is configured to perform network coding on an input spectrogram to obtain a network coding result. The mapping encoder 54 is configured to perform mapping coding on an input network coding result to obtain a mapping coding result. The first decoder 55 is configured to decode an input mapping coding result to obtain a predicted phase information of the second speech segment sample. The first decoder is for predicting a mask and predicting phase information of the speech segment based on the predicted mask and the amplitude of the second speech segment sample. The second decoder 56 is configured to decode an input mapping coding result to obtain a predicted amplitude information of the second speech segment sample. The amplitude enhancement module 57 is configured to obtain an enhanced complex spectrum with enhanced amplitude based on input predicted phase information and input predicted amplitude information. The inverse Fourier transform module 58 is configured to perform inverse short-time Fourier transform on an input enhanced complex spectrum to obtain a predicted time-domain signal of the second speech segment sample. The loss module 59 is configured to compare an input predicted time-domain signal of the second speech segment sample with a standard time-domain signal, and obtain the speech separation model when a difference between the predicted time-domain signal of the second speech segment sample and the standard time-domain signal is within a preset difference range.

Figure 6:
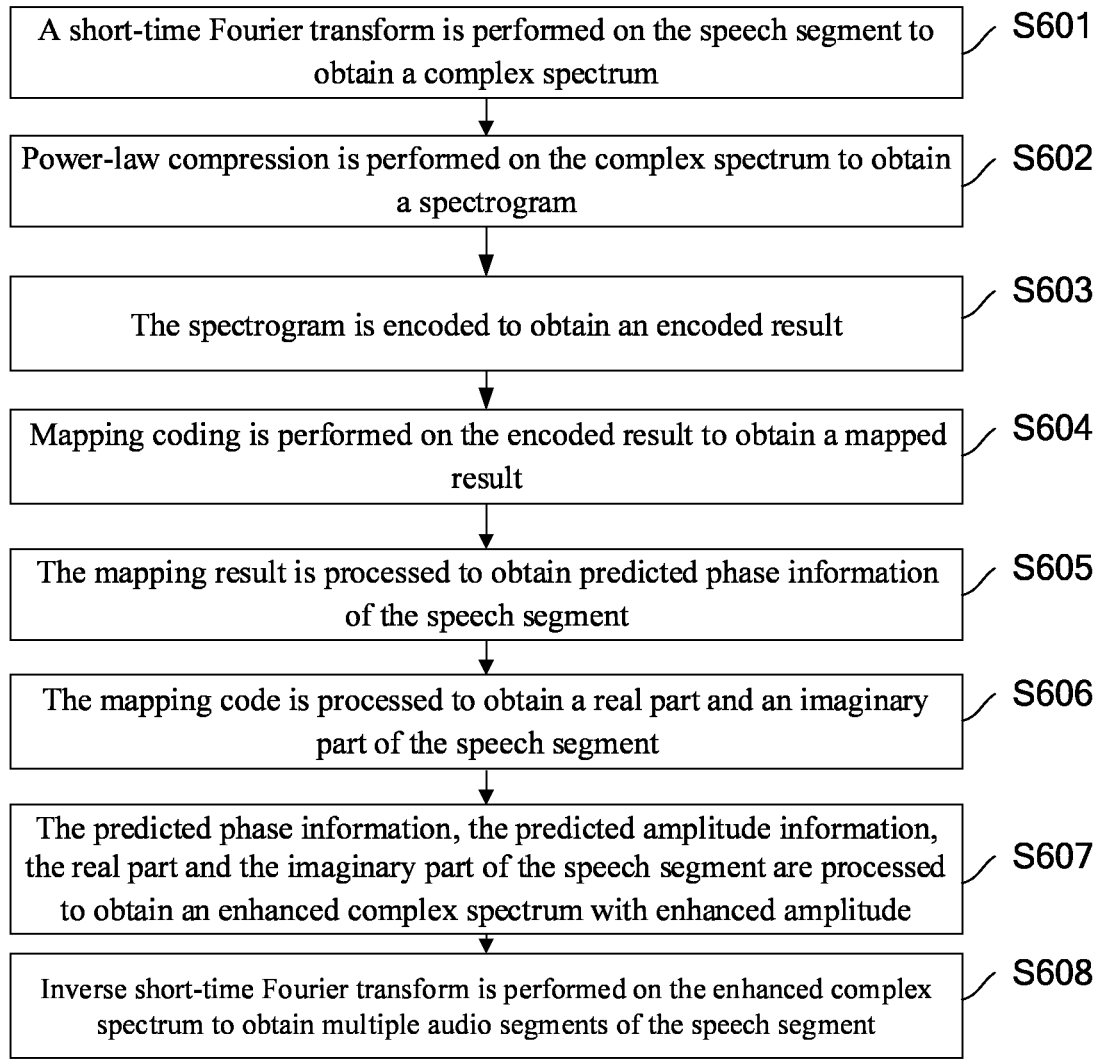
FIG. 6 is a flowchart of a process of speech separation according to one or more embodiments of the present disclosure.

FIG. 6 is a flowchart of a process of speech separation according to one or more embodiments of the present disclosure. As shown in FIG. 6, a method for performing the speech separation performed on each speech segment by a speech separation model to obtain multiple audio segments include steps S601 to S608.

At step S601, a short-time Fourier transform is performed on the speech segment to obtain a complex spectrum.

The short-time Fourier transform is performed on a speech segment by the Fourier transform module to obtain the complex spectrum. The specific structure and function of the Fourier transform module may refer to FIG. 5 and corresponding description, which is not described herein.

At step S602, power-law compression is performed on the complex spectrum to obtain a spectrogram.

The power-law compression is performed by the compression module to obtain a compressed spectrogram. The specific structure and function of the compression module may refer to FIG. 5 and the corresponding description, which is not described herein.

At step S603, network coding is performed on the spectrogram to obtain a network coding result.

Network coding is performed on the spectrogram by the network encoder to obtain the network coding result. The specific structure and function of the network encoder may refer to FIG. 5 and the corresponding description, which is not described herein.

At step S604, mapping coding is performed on the network coding result to obtain a mapping coding result.

Mapping coding is performed on the network coding result by the mapping encoder to obtain the mapping coding result. The specific structure and function of the mapping encoder may refer to FIG. 5 and the corresponding description, which is not described herein.

At step S605, the mapping coding result is processed to obtain predicted phase information of the speech segment.

The mapping coding result is processed by the first decoder to obtain the predicted phase information of the speech segment. The structure and function of the first decoder may refer to FIG. 5 and the corresponding description, which is not described herein.

At step S606, the mapping code result is processed to obtain a real part and an imaginary part of the speech segment.

The mapping code result is processed by the second decoder to obtain the predicted amplitude information of the speech segment, and the real part and the imaginary part of the speech segment. The structure and function of the second decoder may refer to FIG. 5 and the corresponding description, which is not described herein.

At step S607, the predicted phase information, the predicted amplitude information, the real part and the imaginary part of the speech segment are processed to obtain an enhanced complex spectrum with enhanced amplitude.

At Step S608, inverse short-time Fourier transform is performed on the enhanced complex spectrum to obtain multiple audio segments of the speech segment.

Figure 12:
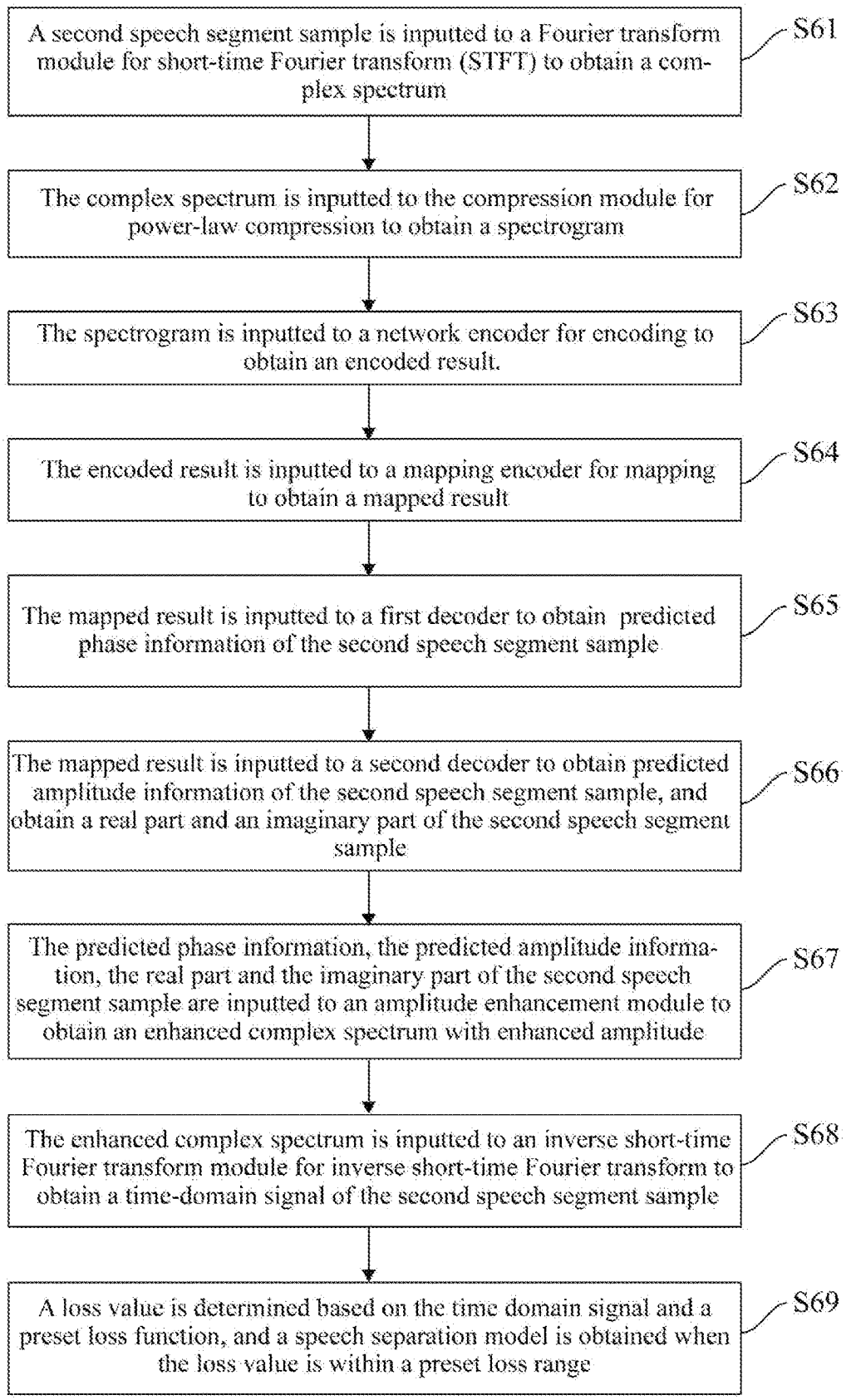
FIG. 12 is a flowchart of a process of obtaining a speech separation model according to one or more embodiments of the present disclosure.

In one or more embodiments of the present disclosure, the speech separation model is obtained by steps S61 to S69 as shown in FIG. 12.

At step S61, the second speech segment sample is inputted to the Fourier transform module for short-time Fourier transform (STFT) to obtain a complex spectrum.

A speech waveform in the second speech segment sample is inverted into a complex spectrum by a short-time Fourier transform.

At step S62, the complex spectrum is inputted to the compression module for power-law compression to obtain a spectrogram.

A power-law compression is performed to obtain a compressed spectrum, so that importance of a quiet sound is equal to that of a loud sound.

At step S63, the spectrogram is inputted to a network encoder for network coding to obtain a network coding result.

The network encoder comprises two convolutional blocks. Each convolutional block comprises a convolutional layer, an instance normalization layer and a Parametric Rectified Linear Unit (PReLU) activation layer. The network encoder may include a Fast Forward Moving Picture Expert Group (FFmpeg) converter.

At step S64, the network coding result is inputted to the mapping encoder for mapping coding to obtain a mapping coding result.

The mapping encoder may employ Two-stage Conformer (TS-Conformer) encoder. In each stage, input_channel=32, conv_kernel=7. The TS-Conformer encoder can capture both time dependence and frequency dependence.

At step S65, the mapping coding result is inputted to the first decoder to obtain the predicted phase information of the second speech segment sample.

The first decoder is used to predict a mask, i.e., to obtain a predicted mask, and then to predict phase information of the speech segment based on the predicted mask and the amplitude of the second speech segment sample. According to one or more embodiments of the present disclosure, the first decoder may include a mask decoder.

At step S66, the mapping coding result is inputted to the second decoder to obtain the predicted amplitude information of the second speech segment sample, and obtain the real part and the imaginary part of the second speech segment sample.

The second decoder may include a complex decoder, which may directly predict the real part and imaginary part of the second speech segment sample.

At step S67, the predicted phase information, the predicted amplitude information, the real part and the imaginary part of the second speech segment sample are inputted to the amplitude enhancement module to obtain the enhanced complex spectrum with enhanced amplitude.

The predicted phase information $Y_P$ and the predicted amplitude information $\hat{X}_m$ are combined, and then added to the output $(\hat{X}_r', \hat{X}_i')$ of the second decoder to obtain the enhanced complex spectrum with enhanced amplitude: $(\hat{X}_r, \hat{X}_i)$.

$$\hat{X}_r = \hat{X}_m \cos(Y_P) + \hat{X}_r'$$

$$\hat{X}_i = \hat{X}_m \sin(Y_P) + \hat{X}_i'$$

At step S68, the enhanced complex spectrum is inputted to the inverse short-time Fourier transform module for an inverse short-time Fourier transform to obtain the time-domain signal of the second speech segment sample.

At Step S69, a loss value is determined based on the time domain signal and a preset loss function, and a speech separation model is obtained when the loss value is within a preset loss range.

According to one or more embodiments of the present disclosure, the loss function may include a time-domain Mean Squared Error loss (MSEloss) function. In order to solve a problem of prediction order of speakers, the speech separation model may also be trained by a Permutation Invariant Training (PIT) method, and a distance between separated speech is added as separation loss.

In one or more embodiments of the present disclosure, the second speech segment sample may be raw data generated by a customer service system or may include near field data obtained from a conference cloud. In order to make the trained speech separation model more accurate, the raw data is subjected to an augmentation process to obtain more second speech segment samples.

The augmentation process includes operations such as noise reduction, pitch shift, speech mix, reverberation addition, and noise addition.

The noise reduction model is intended to remove noises such as background noise and plosive sound in microphone, and may be a Frequency Recurrence Convolutional Recurrent Network (FRCRN) of 16 k on ModelScope.

The pitch shift includes disturbing the speech. The disturbed speech will be regarded as coming from a different speaker. A disturbance of [−200, 200] may be performed using Sound eXchange (sox).

During speech mix, one to three different speakers may be randomly selected, and the audio data of each speaker is randomly cropped and spliced (including Overlap) into audio data of 10s, where Signal to Interference Ratio (SIR) =−3~3 dB. The audio data contains 140000 pieces of data for one speaker, 140000 pieces of data for two speakers, and 49000 pieces of data for three speakers, with a total audio duration of 914 hours.

Reverberation addition can make the sound more natural. According to one or more embodiments of the present disclosure, 20,000 8-channel Room Impulse Responses (RIRs) may be randomly generated. Reverberation Time 60 (RT60)=0.03~0.2. The room has a length/width ranging from 3 m to 10 m, and a height ranging from 2.5 m to 4 m. Reverberation is added to speech and noise. RIR is generated by an open source tool FRAM_RIR.

Noise addition may use a DNS noise data set of a total of 65,000 pieces. One to three kinds of noise and one kind of white noise are randomly added to each speech, where the signal-to-noise ratio of the noise is SNR=10~20 dB, and the signal-to-noise ratio of the white noise is SNR=15~35 dB.

The speech separation model is trained with the augmented second speech segment sample. The number of the second speech segment samples may be increased. More importantly, the accuracy of the speech separation model can be improved.

It should be noted that in training the speech separation model, the second speech segment samples may be classified based on the number of speakers, and the speech separation model may be trained by using the second speech segment samples with the same number of speakers. Also, the speech separation model may be trained in an ascending order of the number of speakers. For example, when the number of speakers is 3, 2 channels may be randomly selected for model training based on the two channels, and then 3 channels are selected for model training based on the three channels.

In order to increase the prediction ability of the speaker's order, training may be performed in a Permutation Invariant Training (PIT) manner. It is also possible to increase the distance between separated speech as a separation loss to determine the cut-off condition of the speech separation model.

In one or more embodiments of the present disclosure, the speech separation model may also include a Conformer-Based Metric Generative Adversarial Network (CMGAN) model or other models, and is trained using the second speech segment sample. The training method is the same as that of the speech separation model according to one or more embodiments of the present disclosure, which is not described herein.

At step S204, speech recognition is performed on multiple audio segments to obtain a speech recognition result of each audio segment.

According to one or more embodiments of the present disclosure, speech recognition may be performed on multiple audio segments through a speech recognition model to obtain a speech recognition result of each audio segment.

In one or more embodiments of the present disclosure, a trained speech recognition model is obtained in the following way.

The speech recognition sample is augmented to obtain a speech recognition training sample which includes the speech recognition sample and the augmented speech recognition sample. The speech recognition training sample is inputted to a speech recognition model to be trained, and a speech recognition result corresponding to the speech recognition sample is outputted by the speech recognition model. A speech recognition loss value is determined based on the speech recognition result corresponding to the speech recognition sample and a preset loss function, and a trained speech recognition model is obtained when the speech recognition loss value is less than or equal to a preset loss threshold value.

The speech recognition sample is an audio segment after speech separation or an audio segment having only one speaker, in other words, there is only one speaker in each speech recognition sample.

According to one or more embodiments of the present disclosure, the augmentation process may be performed on-line or off-line. When the augmentation process is performed on-line, the process may be performed by noise addition, speed change and spectrum augmentation. The signal-to-noise ratio of noise addition may be randomly selected, such as 15:20, 15:25, and 20:25. The speed change may include speed increase and speed decrease, for example, the speed change range is 0.9~1.1 times the original speed. During spectrum augmentation, the maximum mask time is 20 hours and the maximum mask frequency is 10. The number of speech recognition samples is increased, that is, the total time of the speech recognition samples is increased by tens of times, thereby enhancing the robustness of the speech recognition model.

When the augmentation process is performed off-line, the augmentation process is the same as the augmentation process when the speech separation model is trained, which is not described herein.

In one or more embodiments of the present disclosure, the speech recognition samples for training the speech recognition model are audio segments outputted by the speech separation model.

According to one or more embodiments of the present disclosure, the audio segment outputted by the speech separation model is used as a speech recognition sample for training the speech recognition model in order to train the speech separation model together with the speech recognition model. According to one or more embodiments embodiment of the present disclosure, the separated audio segment outputted by the speech separation model may be used as a speech recognition sample for training the speech recognition model. The test set used in training the speech separation model may also be separated to obtain the separated audio segment, and the separated audio segment is used as a speech recognition sample for training the speech recognition model.

When the speech separation model together with the speech recognition model are trained, weight of speech separation loss and weight of speech recognition loss may be set. According to one or more embodiments of the present disclosure, the specific values of the weights of speech separation loss and speech recognition loss are not limited. For example, the weight of the speech separation loss is set to 0.1, and the weight of the speech recognition loss is set to 0.9. Alternatively, the weight of the speech separation loss is set to 0.2, and the weight of the speech recognition loss is set to 0.8.

When the speech separation model together with the speech recognition model are trained, learning rate may also be set. The learning rate may be arbitrarily set as required, for example, the learning rate is set to 0.0005. It should be noted that the learning rate is set to a smaller value, so that the amplitude of oscillation in the model's learning direction is reduced, thereby reducing learning in a wrong direction.

In one or more embodiments of the present disclosure, the speech raw data may be directly used as a training sample. Speech activity detection may be performed on the speech raw data to obtain multiple speech segments, the number of speakers in each speech segment is determined, and if the speech segment has only one speaker, the speech raw data may be directly used as a training sample for the speech recognition model. If the speech segment has multiple speakers, the speech segment is inputted to the speech separation model, and the audio segment outputted from the speech separation model is used as a training sample for the speech recognition model for gradient Backpropagation. A total loss value is determined based on a speech separation loss value and a speech recognition loss value. When the total loss value is less than or equal to a preset total loss threshold value, training of the speech separation model and the speech recognition model is completed.

At Step S205, features are extracted from multiple audio segments to obtain a voiceprint feature vector of each audio segment.

In one or more embodiments of the present disclosure, features may be extracted from the audio segments by a feature extraction tool such as kaldi, python_speech, and the like.

At Step S206, the speakers are clustered based on the voiceprint feature vectors of multiple audio segments to obtain a clustering result.

Clustering includes clustering the audio segments of the same speaker together, i.e., the clustering result includes the audio segments corresponding to each speaker.

Since a conversation (according to one or more embodiments of the present disclosure, a conference recording is referred to as a conversation) generally includes multiple audio segments generated by multiple speakers, it is necessary to cluster the audio segments of each speaker, i.e., to determine the speaker of each audio segment.

In one or more embodiments of the present disclosure, audio segments are clustered in the following way.

The voiceprint feature vectors of multiple audio segments are normalized to obtain a normalized feature vector corresponding to each audio segment. Each normalized feature vector is transposed to obtain a corresponding transposed feature vector. The inner product of each normalized feature vector and its corresponding transposed feature vector is calculated to obtain a cross similarity matrix of the multiple audio segments, where each row of the cross similarity matrix represents a class. The multiple audio segments are clustered based on the cross similarity matrix until a new cross similarity matrix meets a clustering termination condition, so that a clustering result is obtained.

In one or more embodiments of the present disclosure, the purpose of the normalization processing is to eliminate the size difference between different audio segments, and the amplitudes of different audio segments can be limited between [−1, 1]. According to one or more embodiments of the present disclosure, the specific method of the normalization processing is not limited. For example, the normalization processing may be performed by a tool such as ASV-Subtools.

In one or more embodiments of the present disclosure, the transposition processing is to obtain the similarity matrix of the audio segments. In the similarity matrix, the value of each element represents the similarity between the audio segment voiceprint information of the row in which the element is located and the audio segment voiceprint information of the column in which the element is located. According to one or more embodiments of the present disclosure, the specific method of the transposition processing is not limited. For example, a normalized feature vector of dimension N*M is transposed to a transposed feature vector of dimension M*N, where N is the number of chunks, and M is the length of each voiceprint vector, which may be 192, 256, 512, or the like.

In one or more embodiments of the present disclosure, internal product of each normalized feature vector and its corresponding transposed feature vector is calculated to obtain a cross similarity matrix of the multiple audio segments. For example, the internal product of the normalized feature vector of dimension N*M and the transposed feature vector of dimension M*N is calculated to obtain a cross similarity matrix of dimension N*N, which is a scoring matrix, with each row representing a class.

In one or more embodiments of the present disclosure, the clustering includes: calculating a distance between any two rows in the cross similarity matrix; and merging two closest rows to obtain a new cross similarity matrix.

The distance between any two rows may be Consine similarity or Euclidean distance. The distance between any two rows in the cross similarity matrix is calculated to obtain $C_N^2$ distances. The two rows closest to each other are merged into a class. After merging the two rows closest to each other, a new cross similarity matrix is obtained.

In one or more embodiments of the present disclosure, the distance between any two rows is re-calculated based on the new cross similarity matrix until the new cross similarity matrix satisfies a termination condition, so that a clustering result is obtained. In the clustering result, each class corresponds to the audio segments of one speaker, i.e., audio segments of the same speaker are clustered into one class.

For example, if 6 pieces of speech data is inputted and the obtained clustered result is [0 1 1 0 1 1], the speaker classes to which the first piece of speech data to sixth piece of speech data belong are 0, 1, 1, 0, 1, 1, and 1, respectively, where 0 and 1 represent different speakers, respectively.

In one or more embodiments of the present disclosure, the clustering termination condition includes there are only two remaining rows in the cross similarity matrix after clustering.

In one or more embodiments of the present disclosure, rows in the cross similarity matrix are merged and clustering is completed when there are only remaining two rows in the cross similarity matrix.

At Step S207, a speech recognition result corresponding to each speaker in the speech data is obtained based on the clustering result and the speech recognition result of each audio segment.

The clustering result of each audio segment in the speech data is associated with the speech recognition result of each audio segment, and the audio segment belonging to the same class is associated with the speech recognition result of each audio segment, so that the speech recognition result corresponding to each speaker in the speech data is obtained.

In one or more embodiments of the present disclosure, the obtaining of the speech recognition result corresponding to each speaker in the speech data based on the clustering result and the speech recognition result of each audio segment includes: associating the target audio segment of each speaker in the speech data with the speaker based on the clustering result, so that the speech recognition result corresponding to each speaker in the speech data is obtained.

In the clustering result, each class corresponds to one speaker. Therefore, the speaker corresponding to each audio segment can be determined based on the clustering result. After the speaker corresponding to the audio segment is determined, the speech recognition result corresponding to the audio segment is associated with the speaker, so that the speech recognition result corresponding to each speaker in the speech data is obtained.

It will be appreciated that each of the above-mentioned method embodiments mentioned in the present disclosure may be combined with each other to form a combined embodiment without departing from the principle logic, and the present disclosure will not be described in detail. It will be appreciated by those skilled in the art that in the above methods according to one or more embodiments of the present disclosure, the specific order of execution of the steps should be determined in terms of their function and possible intrinsic logic.

In the speech recognition method according to one or more embodiments of the present disclosure, speech activity detection is performed on the speech data to obtain multiple speech segments. When the number of speakers is multiple, speech separation is performed on each speech segment, so that the overlapping part of the speech segment is separated and multiple audio segments each corresponding to one speaker are obtained. Speech recognition is performed on each audio segment to obtain the speech recognition result corresponding to each audio segment. Feature extraction is performed on the multiple audio segments to obtain the voiceprint feature vector corresponding to each audio segment. The speakers are clustered based on the voiceprint feature vectors of the multiple audio segments to obtain the clustering result. Then, the speech recognition result of each speaker in the speech data is obtained based on the clustering result and the speech recognition result of each audio segment. Both speech recognition and clustering are performed on the basis of the separated audio segments. Compared to direct recognition of speech segments, the overlapping parts of multiple speakers are separated into different audio segments, so that the accuracy of speech recognition can be improved, clustering based on the separated audio segments is more accurate, and the determination of speakers is more accurate. Therefore, even in a multi-channel and multi-speaker scenario, speech recognition can be accurately performed.

Figure 7:
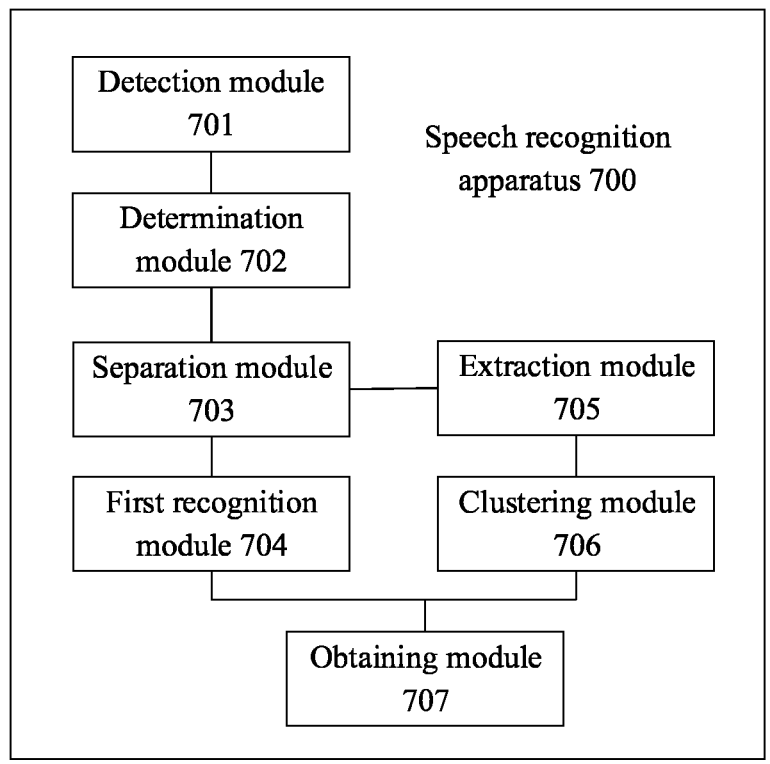
FIG. 7 is a block diagram of a speech recognition apparatus according to one or more embodiments of the present disclosure.

FIG. 7 is a block diagram of a speech recognition apparatus according to one or more embodiments of the present disclosure.

Referring to FIG. 7, according to one or more embodiments of the present disclosure, a speech recognition apparatus 700 includes a detection module 701 to an obtaining module 707.

The detection module 701 is configured to perform speech activity detection on the speech data to obtain multiple speech segments.

A determination module 702 is configured to determine the number of speakers in each speech segment.

In one or more embodiments of the present disclosure, the determination module 702 determines the number of speakers corresponding to each speech segment using the speaker division model.

In one or more embodiments of the present disclosure, the speaker division model includes a feature extraction module, an encoding module, a decoding module, a merging module, and a prediction module. The feature extraction module is configured to extract the voiceprint feature of the speech segment and the Mel-scale Frequency Cepstral Coefficients feature. The encoding module is configured to encode the Mel-scale Frequency Cepstral Coefficients feature to obtain the encoded feature vector. The decoding module is configured to decode the encoded feature vector to obtain the decoded feature vector. The merging module is configured to merge the decoded feature vector and the voiceprint feature vector to obtain the prediction feature vector. The prediction module is configured to predict the number of speakers based on the prediction feature vector to obtain the number of speakers.

In one or more embodiments of the present disclosure, the speaker division model determines the number of speakers corresponding to each speech segment in the following way. The voiceprint feature of the speech segment and the Mel-scale Frequency Cepstral Coefficients feature are extracted; the Mel-scale Frequency Cepstral Coefficients feature is encoded to obtain the encoded feature vector. the encoded feature vector is decoded to obtain the decoded feature vector; the decoded feature vector and the voiceprint feature vector are merged to obtain the prediction feature vector; and the number of speakers is predicted based on the prediction feature vector to obtain the number of speakers.

In one or more embodiments of the present disclosure, the feature extraction module includes a voiceprint feature network and a Mel-scale Frequency Cepstral Coefficients network. The voiceprint feature network is configured to extract voiceprint features of the speech segment. The Mel-scale Frequency Cepstral Coefficients network is configured to extract the Mel-scale Frequency Cepstral Coefficients (MFCC) feature. The encoding module includes a convolution-augmented self-attention neural network, for example a Conformer network. The decoding module includes a self-attention neural network. The merging module is configured to merge the decoded feature vector and the voiceprint feature vector using a Merge algorithm. The prediction module includes a Long Short-Term Memory (LSTM) network.

The separation module 703 is configured to perform speech separation on the speech segment when the number of speakers in the speech segment is multiple, so as to obtain multiple audio segments.

In a case where the number of speakers is one, the speech segment in which the number of speakers is one is used as an audio segment, and each audio segment corresponds to one speaker.

In one or more embodiments of the present disclosure, the separation module 703 is configured to perform speech separation on each speech segment using the speech separation model to obtain multiple audio segments.

In one or more embodiments of the present disclosure, the speech separation model includes a Fourier transform module, a compression module, a network encoder, a mapping encoder, a first decoder, a second decoder, an amplitude enhancement module, an inverse Fourier transform module, and a loss module.

The Fourier transform module is configured to perform a short-time Fourier transform on the second speech segment sample to obtain the complex spectrum.

The compression module is configured to perform the power-law compression on the input complex spectrum to obtain the spectrogram.

The network encoder is configured to perform network coding on the input spectrogram to obtain the network coding result.

The mapping encoder is configured to perform mapping coding on the input network coding result to obtain the mapping coding result.

The first decoder is configured to decode the input mapping coding result to obtain the predicted phase information of the second speech segment sample.

The second decoder is configured to decode the input mapping coding result to obtain the predicted amplitude information, the real part and the imaginary part of the second speech segment sample.

The amplitude enhancement module is configured to obtain the enhanced complex spectrum with enhanced amplitude based on input predicted phase information, input predicted amplitude information, and the real part and the imaginary part of the second speech segment sample.

The inverse Fourier transform module is configured to perform inverse short-time Fourier transform on the input enhanced complex spectrum to obtain the predicted time-domain signal of the second speech segment sample.

The loss module is configured to determine the loss value based on the input predicted time-domain signal of the second speech segment sample and the preset loss function, and obtain the speech separation model when the loss value is within a preset loss range.

In one or more embodiments of the present disclosure, the speech separation model performs speech separation on each speech segment to obtain multiple audio segments in the following way. A short-time Fourier transform is performed on the speech segment to obtain the complex spectrum; the power-law compression is performed on the complex spectrum to obtain the spectrogram; network coding is performed on the spectrogram to obtain the network coding result; mapping coding is performed on the network coding result to obtain the mapping coding result; the mapping coding result is decoded to obtain the predicted phase information and the predicted amplitude information of the speech segment; the mapping coding result is decoded to obtain the real part and the imaginary part of the speech segment; the enhanced complex spectrum with enhanced amplitude is obtained based on the predicted phase information, predicted amplitude information, and the real part and the imaginary part of the speech segment sample; and inverse short-time Fourier transform is performed on the enhanced complex spectrum to obtain multiple audio segments of the speech segment.

A first recognition module 704 is configured to perform speech recognition on multiple audio segments to obtain the speech recognition result corresponding to each audio segment.

In one or more embodiments of the present disclosure, the first recognition module 704 is configured to perform speech recognition on each audio segment using the speech recognition model to obtain the speech recognition result corresponding to each audio segment.

In one or more embodiments of the present disclosure, the trained speech recognition model is obtained in the following way. The speech recognition sample is augmented to obtain the speech recognition training sample which includes the speech recognition sample and the augmented speech recognition sample. The speech recognition training sample is inputted to the speech recognition model to be trained, and the speech recognition result corresponding to the speech recognition sample is outputted by the speech recognition model. The speech recognition loss value is determined based on the speech recognition result corresponding to the speech recognition sample and the preset loss function, and the trained speech recognition model is obtained when the speech recognition loss value is less than or equal to the preset loss threshold value.

In one or more embodiments of the present disclosure, the speech recognition sample for training the speech recognition model is the audio segment outputted by the speech separation model, so that the speech recognition model together with the speech separation model are trained.

An extraction module 705 is configured to perform feature extraction on multiple audio segments to obtain the voiceprint feature vector corresponding to each audio segment.

A clustering module 706 is configured to cluster the speakers based on the voiceprint feature vectors of multiple audio segments to obtain a clustering result including the audio segments corresponding to each speaker.

In one or more embodiments of the present disclosure, the clustering module 706 is configured to normalize the voiceprint feature vectors of multiple audio segments to obtain the normalized feature vector corresponding to each audio segment; transpose each normalized feature vector to obtain the corresponding transposed feature vector; calculate the inner product of each normalized feature vector and its corresponding transposed feature vector to obtain the cross similarity matrix of the multiple audio segments, where each row of the cross similarity matrix represents a class; and cluster based on the cross similarity matrix until the new cross similarity matrix meets a clustering termination condition, so that the clustering result is obtained.

In one or more embodiments of the present disclosure, the clustering includes: calculating a distance between any two rows in the cross similarity matrix; and merging two closest rows to obtain a new cross similarity matrix.

In one or more embodiments of the present disclosure, the clustering termination condition includes there are only two remaining rows in the cross similarity matrix after clustering.

The obtaining module 707 is configured to obtain the speech recognition result corresponding to each speaker in the speech data based on the clustering result and the speech recognition result corresponding to each audio segment.

In one or more embodiments of the present disclosure, the obtaining module 707 is configured to determine the target audio segment of each speaker in the speech data with the speaker based on the clustering result, and associate the speech recognition result of each audio segment with the speaker, so as to obtain the speech recognition result corresponding to each speaker in the speech data.

In the speech recognition apparatus according to one or more embodiments of the present disclosure, the determination module is configured to perform speech activity detection on the speech data to obtain multiple speech segments. The separation module is configured to perform speech separation on each speech segment when the number of speakers is multiple, so that the overlapping part of the speech segment is separated and multiple audio segments each corresponding to one speaker are obtained. The separation module is configured to use the speech segment as the audio segment when the number of speakers is one. Speech recognition is performed on each audio segment, so that the speech recognition result of each audio segment is obtained. The first recognition module is configured to perform speech recognition on each audio segment to obtain the speech recognition result corresponding to each audio segment. The extraction module is configured to perform feature extraction on the multiple audio segments to obtain the voiceprint feature vector corresponding to each audio segment. The clustering module is configured to cluster the speakers based on the voiceprint feature vectors of the multiple audio segments to obtain the clustering result. The obtaining module is configured to obtain the speech recognition result corresponding to each speaker in the speech data based on the clustering result and the speech recognition result of each audio segment. Both speech recognition and clustering are performed on the basis of the separated audio segments. Compared to direct recognition of speech segments, the overlapping parts of multiple speakers are separated into different audio segments for speech recognition, so that the accuracy of speech recognition can be improved, clustering based on the separated audio segments is more accurate, and the audio segments of different speakers can be classified accurately. Therefore, even in a multi-channel and multi-speaker scenario, different speakers and corresponding speech can be accurately recognized.

Figure 8:
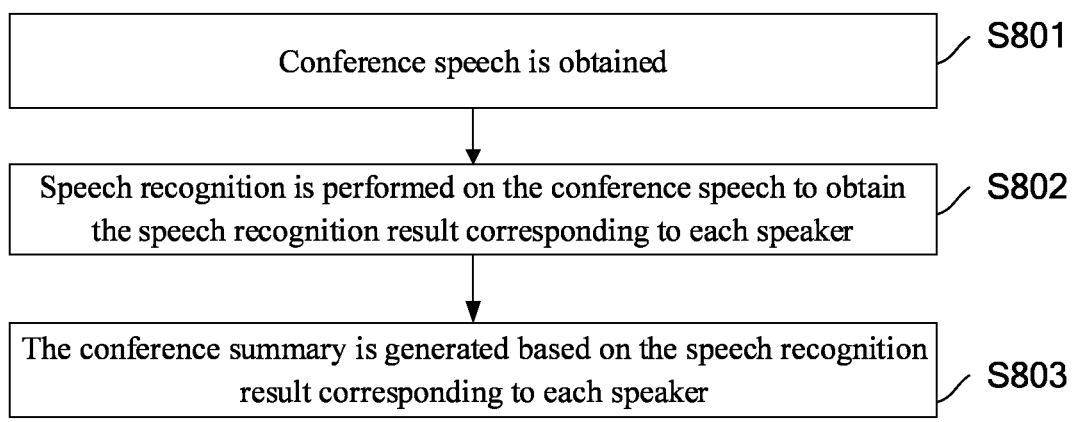
FIG. 8 is a flowchart of a method of generating a conference summary according to one or more embodiments of the present disclosure.

One or more embodiments provide a method of generating a conference summary in a multi-person meeting scenario. FIG. 8 is a flowchart of a method of generating a conference summary according to one or more embodiments of the present disclosure. As shown in FIG. 8, the method of generating the conference summary includes steps S801 to S803.

At step S801, conference speech is obtained.

The conference speech is a voice recorded during a multi-microphone multi-speaker conference.

At step S802, speech recognition is performed on the conference speech to obtain the speech recognition result corresponding to each speaker.

At step S802, speech recognition is performed on the conference speech by the speech recognition method according to one or more embodiments of the present disclosure, to obtain THE speech recognition result corresponding to each speaker. The speech recognition method includes the speech recognition method according to one or more embodiments of the present disclosure, which is not described herein.

At Step S803, the conference summary is generated based on the speech recognition result corresponding to each speaker.

The speech recognition results corresponding to the speakers are sorted according to the speaking order of the speakers to generate a conference summary.

In one or more embodiments of the present disclosure, after step S801, the method further includes saving the conference speech. The conference speech may be saved locally or in a designated server.

According to one or more embodiments of the present disclosure, the method of generating the conference summary can recognize the speech from multiple channels and multiple speakers, thereby improving the accuracy of the conference summary.

Figure 9:
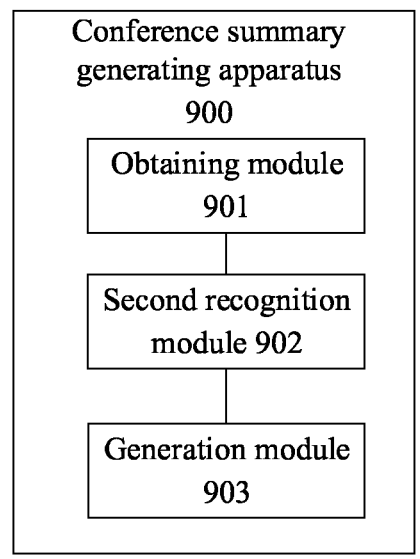
FIG. 9 is a block diagram of an apparatus for generating a conference summary according to one or more embodiments of the present disclosure.

FIG. 9 is a block diagram of an apparatus for generating a conference summary according to one or more embodiments of the present disclosure. As shown in FIG. 9, the apparatus for generating the conference summary 900 includes modules 901 to 903.

An obtaining module 901 is configured to obtain conference speech recorded in a multi-channel multi-speaker conference.

A second recognition module 902 is configured to perform speech recognition on the conference speech by using the speech recognition method according to one or more embodiments of the present disclosure, so as to obtain the speech recognition result corresponding to each speaker.

A generation module 903 is configured to generate the conference summary based on the speech recognition result corresponding to each speaker.

In one or more embodiments of the present disclosure, the apparatus for generating the conference summary 900 further includes a storage module configured to store the conference speech. The storage module may be a local storage module or a storage module in a designated server.

According to one or more embodiments of the present disclosure, the apparatus for generating the conference summary can recognize the speech from multiple channels and multiple speakers, thereby improving the accuracy of the conference summary.

Figure 10:
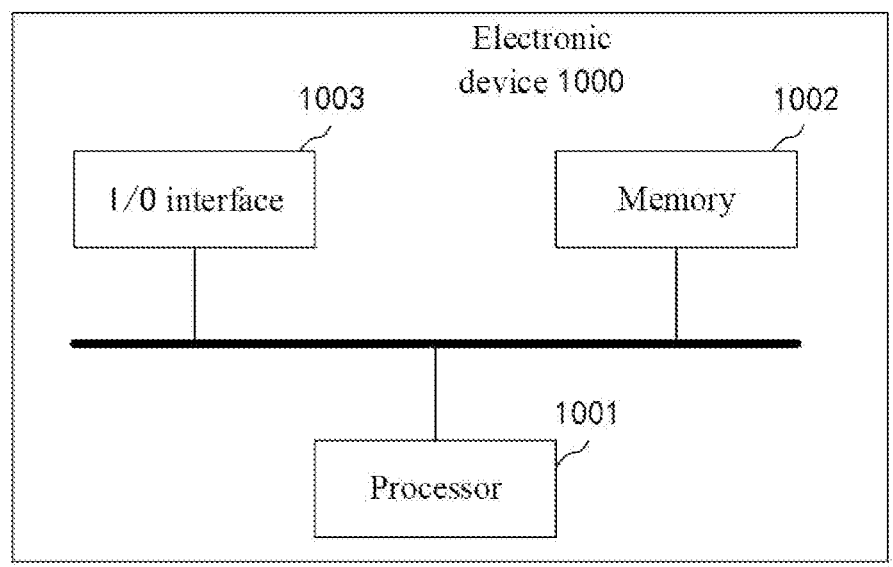
FIG. 10 is a block diagram of an electronic device according to one or more embodiments of the present disclosure.

FIG. 10 is a block diagram of an electronic device according to one or more embodiments of the present disclosure.

Referring to FIG. 10, according to one or more embodiments of the present disclosure, an electronic device 1000 includes: at least one processor 1001; at least one memory 1002; and one or more I/O interfaces 1003 each connected between the processor 1001 and the memory 1002. The memory 1002 is configured to store one or more computer programs executable by the at least one processor 1001 to perform operations in the above-described speech recognition method.

In one or more embodiments of the present disclosure, the processor 1001 is further configured to perform a speech activity detection on the speech data to obtain multiple speech segments; determine the number of speakers in each speech segment; perform speech separation on the speech segment to obtain multiple audio segments, in a case where the number of speakers in the speech segment is multiple; perform speech recognition on the multiple audio segments to obtain the speech recognition result of each audio segment; extract features from the multiple audio segments to obtain the voiceprint feature vector of each audio segment; cluster the speakers based on the voiceprint feature vectors of the multiple audio segments to obtain the clustering result including the audio segments corresponding to each speaker; and obtain the speech recognition result corresponding to each speaker in the speech data based on the clustering result and the speech recognition result of each audio segment.

In one or more embodiments of the present disclosure, in a case where the number of speakers in the speech segment is one, the speech segment in which the number of speakers is one is used as the audio segment, and each audio segment corresponds to one speaker.

In one or more embodiments of the present disclosure, the processor 1001 is further configured to determine the number of speakers corresponding to each speech segment using the speaker division model in the following way. The voiceprint feature of the speech segment and the Mel-scale Frequency Cepstral Coefficients feature are extracted; the Mel-scale Frequency Cepstral Coefficients feature is encoded to obtain the encoded feature vector; the encoded feature vector is decoded to obtain the decoded feature vector; the decoded feature vector and the voiceprint feature vector are merged to obtain the prediction feature vector; and the number of speakers based on the prediction feature vector is predict to obtain the number of speakers.

In one or more embodiments of the present disclosure, the processor 1001 is further configured to perform speech recognition on multiple audio segment by using the speech recognition model. The trained speech recognition model is obtained in the following way. The speech recognition sample is augmented to obtain the speech recognition training sample which includes the speech recognition sample and the augmented speech recognition sample. The speech recognition training sample is inputted to the speech recognition model to be trained, and the speech recognition result corresponding to the speech recognition sample is outputted by the speech recognition model. The speech recognition loss value is determined based on the speech recognition result corresponding to the speech recognition sample and the preset loss function, and the trained speech recognition model is obtained when the speech recognition loss value is less than or equal to the preset loss threshold value.

In one or more embodiments of the present disclosure, the processor 1001 is further configured to perform speech separation on each speech segment by using the speech separation model to obtain multiple audio segments in the following way. A short-time Fourier transform is performed on the speech segment to obtain the complex spectrum; the power-law compression is performed on the complex spectrum to obtain the spectrogram; network coding is performed on the spectrogram to obtain the network coding result; mapping coding is performed on the network coding result to obtain the mapping coding result; the mapping coding result is decoded to obtain the predicted phase information and the predicted amplitude information of the speech segment; the mapping coding result is decoded to obtain the real part and the imaginary part of the speech segment; the enhanced complex spectrum with enhanced amplitude is obtained based on the predicted phase information, predicted amplitude information, and the real part and the imaginary part of the speech segment; and inverse short-time Fourier transform is performed on the enhanced complex spectrum to obtain multiple audio segments of the speech segment.

In one or more embodiments of the present disclosure, the processor 1001 is further configured to normalize the voiceprint feature vectors of multiple audio segments to obtain the normalized feature vector corresponding to each audio segment; transpose each normalized feature vector to obtain the corresponding transposed feature vector; calculate the inner product of each normalized feature vector and the corresponding transposed feature vector to obtain the cross similarity matrix of the multiple audio segments, where each row of the cross similarity matrix represents a class; and cluster based on the cross similarity matrix to obtain a new cross similarity matrix until the new cross similarity matrix meets a clustering termination condition, so that the clustering result is obtained. The clustering includes: calculating a distance between any two rows in the cross similarity matrix; and merging two closest rows to obtain the new cross similarity matrix.

In one or more embodiments of the present disclosure, the processor 1001 is further configured to associate audio segments of each speaker in the speech data with each speaker based on the clustering results to obtain the speech recognition result corresponding to each speaker in the speech data.

According to one or more embodiments of the present disclosure, a computer-readable storage medium has a computer program stored thereon executed by a processor/processing core to perform operations in the above-described speech recognition method. The computer-readable storage medium may be a volatile or non-volatile computer-readable storage medium.

According to one or more embodiments of the present disclosure, a computer program product includes computer-readable codes, or a non-volatile computer-readable storage medium carrying the computer-readable codes. When the computer-readable codes are run in a processor of an electronic device, the processor in the electronic device performs the above-described speech recognition method.

It will be appreciated by those of ordinary skill in the art that all or some of the steps, systems, functional modules/units in apparatuses in the methods disclosed above may be implemented as software, firmware, hardware, and suitable combinations thereof. In a hardware implementation, the division between functional modules/units mentioned in the above description does not necessarily correspond to division of physical components. For example, a physical component may have multiple functions, or a function or step may be cooperatively performed by several physical components. Some or all of the physical components may be implemented as software executed by a processor, such as a central processing unit, a digital signal processor, or a microprocessor, or as hardware, or as an integrated circuit, such as an dedicated integrated circuit. Such software may be distributed on a computer-readable storage medium, which may include a computer storage medium (or a non-transitory medium) and a communication medium (or a transitory medium).

As is well known to those of ordinary skill in the art, the term computer storage medium includes volatile and non-volatile, removable and non-removable medium implemented in any method or technique for storing information (such as computer-readable program instructions, data structures, program modules, or other data). Computer storage medium includes, but is not limited to, Random Access Memory (RAM), Read Only Memory (ROM), Erasable Programmable Read Only Memory (EPROM), Static Random Access Memory (SRAM), flash memory or other memory technology, portable Compact Disk Read Only Memory (CD-ROM), Digital Versatile Disk (DVD) or other optical disk storage, magnetic cassettes, magnetic tape, magnetic disk storage or other magnetic storage devices, or any other medium that may be used to store the desired information and that may be accessed by a computer. Furthermore, it is well known to those of ordinary skill in the art that a communication medium generally contains computer-readable program instructions, data structures, program modules, or other data in a modulated data signal such as a carrier wave or other transmission mechanism, and may include any information delivery medium.

The computer-readable program instructions described herein may be downloaded from a computer-readable storage medium to various computing/processing devices, or via a network, such as the Internet, a local area network, a wide area network, and/or a wireless network, to an external computer or external storage device. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in the respective computing/processing device.

The computer program instructions used to perform the operations of one or more embodiments of the present disclosure may be assembly instructions, Instruction Set Architecture (ISA) instructions, machine instructions, machine-related instructions, microcode, firmware instructions, state setting data, or source or object code written in any combination of one or more programming languages, including object-oriented programming languages such as Smalltalk, C ++, and the like, and conventional procedural programming languages such as "C" language. The computer-readable program instructions may be executed entirely on a user computer, partly on the user computer, as a separate software package, partly on the user computer and partly on the remote computer, or entirely on a remote computer or server. In a case of a remote computer, the remote computer may be connected to the user computer through any kind of network, including a Local Area Network (LAN) or a Wide Area Network (WAN), or may be connected to an external computer (e.g., connected through the Internet using an Internet service provider). In one or more embodiments of the present disclosure, various aspects of one or more embodiments of the present disclosure are implemented by personalizing electronic circuits, such as programmable logic circuits, Field Programmable Gate Arrays (FPGAs), or Programmable Logic Arrays (PLAs), with the status information of the computer-readable program instructions.

The computer program product described herein may be implemented in hardware, software, or a combination thereof. In an alternative embodiment, the computer program product is embodied as a computer storage medium. In another alternative embodiment, the computer program product is embodied as a software product, such as a Software Development Kit (SDK) or the like.

Various aspects of the present disclosure are described herein with reference to flow charts and/or block diagrams of methods, apparatus (systems), and computer program products in accordance with one or more embodiments of the present disclosure. It should be understood that each block of the flowcharts and/or block diagrams, and combinations of blocks in the flowcharts and/or block diagrams, may be implemented by computer-readable program instructions.

These computer-readable program instructions may be provided to a processor of a general purpose computer, special purpose computer, or other programmable data processing apparatus to produce a machine such that, when executed by the processor of the computer or other programmable data processing apparatus, the instructions produce means for implementing the functions/acts specified in one or more blocks of the flowchart and/or block diagram. The computer-readable program instructions may also be stored in a computer-readable storage medium that cause a computer, programmable data processing apparatus, and/or other device to operate in a particular manner, such that the computer-readable medium having the instructions stored thereon includes an article of manufacture that includes instructions that implement various aspects of the functions/acts specified in one or more blocks of the flowchart and/or block diagram.

Computer-readable program instructions may also be loaded onto a computer, other programmable data processing apparatus, or other device such that a series of operational steps are performed on the computer, other programmable data processing apparatus, or other device to produce a computer-implemented process such that the instructions executed on the computer, other programmable data processing apparatus, or other device implement the functions/actions specified in one or more blocks of the flowcharts and/or block diagrams.

The flowcharts and block diagrams in the drawings illustrate architectures, functions, and operations of possible implementations of systems, methods, and computer program products according to one or more embodiments of the present disclosure. In this regard, each block in a flowchart or block diagram may represent a module, program segment, or portion of instructions that contain one or more executable instructions for implementing a specified logical function. In an alternative implementation, the functions noted in the blocks may also occur in an order different from that noted in the drawings. For example, two successive blocks may actually be executed substantially in parallel, and they may sometimes be executed in the reverse order, depending on the functionality involved. It is also noted that each block of the block diagrams and/or flowcharts, and combinations of blocks in the block diagrams and/or flowcharts, may be implemented with a dedicated hardware-based system that performs the specified functions or actions, or may be implemented with a combination of dedicated hardware and computer instructions.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. A speech recognition method, comprising: by an electronic device,
    performing speech activity detection on speech data to obtain a plurality of speech segments;
    determining, for each of the plurality of speech segments, a number of speakers involved in the each of the plurality of speech segments;
    for each of at least one of the plurality of speech segments with the determined number of speakers greater than 1:
        performing speech separation on the each of at least one of the plurality of speech segments to obtain a plurality of audio segments;
        performing speech recognition on each of the plurality of audio segments to obtain respective first speech recognition results for the plurality of audio segments;
        performing feature extraction on each of the plurality of audio segments to obtain respective voiceprint feature vectors of the plurality of audio segments; and
        performing clustering on the plurality of audio segments with respect to the speakers based on the respective voiceprint feature vectors to obtain a clustering result indicating that each of the speakers corresponds to which of the plurality of audio segments; and
    obtaining a second speech recognition result for the speech data based on the clustering result and the respective first speech recognition results for the each of at least one of the plurality of speech segments.

2. The speech recognition method according to claim 1, further comprising: by the electronic device,
    for any one of the plurality of speech segments with the determined number of speakers equal to 1, taking the any one of the plurality of speech segments as an audio segment corresponding to one speaker.

3. The speech recognition method according to claim 1, wherein the determining of the number of speakers involved in the each of the plurality of speech segments comprises:
    using a speaker division model to determine the number of speakers involved in the each of the plurality of speech segments by:
        extracting a voiceprint feature and a Mel-scale Frequency Cepstral Coefficients feature from the each of the plurality of speech segments;
        encoding the Mel-scale Frequency Cepstral Coefficients feature to obtain an encoded feature vector;
        decoding the encoded feature vector to obtain a decoded feature vector;
        merging the decoded feature vector and a vector of the voiceprint feature to obtain a prediction feature vector; and
        predicting a number of speakers based on the prediction feature vector to obtain the number of speakers involved in the each of the plurality of speech segments.

4. The speech recognition method according to claim 3, wherein the extracting of the voiceprint feature and the Mel-scale Frequency Cepstral Coefficients feature comprises:
- extracting the voiceprint feature from the each of the plurality of speech segments by a voiceprint feature network; and
- extracting the Mel-scale Frequency Cepstral Coefficients feature by a Mel-scale Frequency Cepstral Coefficients network.

5. The speech recognition method according to claim 1, wherein the performing of the speech recognition on each of the plurality of audio segments comprises:
- performing the speech recognition on each of the plurality of audio segments by a speech recognition model; and
- the speech recognition model is obtained by:
  - performing augmentation processing on a speech recognition sample to obtain an augmented speech recognition sample, and obtaining a speech recognition training sample comprising the speech recognition sample and the augmented speech recognition sample;
  - inputting the speech recognition training sample into a first speech recognition model to obtain a sample speech recognition result for the speech recognition training sample;
  - determining a speech recognition loss value based on the sample speech recognition result and a preset loss function; and
  - in response to determining that the speech recognition loss value is less than or equal to a preset loss threshold, taking the first speech recognition model as the speech recognition model.

6. The speech recognition method according to claim 5, wherein the performing of the speech separation on the each of at least one of the plurality of speech segments to obtain the plurality of audio segments comprises:
- using a speech separation model to perform the speech separation on the each of at least one of the plurality of speech segments to obtain the plurality of audio segments by:
  - performing short-time Fourier transform on the each of at least one of the plurality of speech segments to obtain a complex spectrum;
  - performing power-law compression on the complex spectrum to obtain a spectrogram;
  - performing network coding on the spectrogram to obtain a network coding result;
  - performing mapping coding on the network coding result to obtain a mapping coding result;
  - performing first processing on the mapping coding result to obtain predicted phase information and predicted amplitude information of the each of at least one of the plurality of speech segments;
  - performing second processing on the mapping coding result to obtain a real part and an imaginary part of the each of at least one of the plurality of speech segments;
  - obtaining an enhanced complex spectrum with an enhanced amplitude based on the predicted phase information, the predicted amplitude information, the real part and the imaginary part; and
  - performing inverse short-time Fourier transform on the enhanced complex spectrum to obtain the plurality of audio segments.

7. The speech recognition method according to claim 6, wherein the speech recognition training sample comprises a plurality of audio segments output by the speech separation model.

8. The speech recognition method according to claim 1, wherein the performing of the clustering on the plurality of audio segments with respect to the speakers based on the respective voiceprint feature vectors to obtain the clustering result comprises:
- normalizing each of the respective voiceprint feature vectors to obtain respective normalized feature vectors of the plurality of audio segments;
- transposing each of the respective normalized feature vectors to obtain respective transposed feature vectors of the plurality of audio segments;
- calculating an inner product of each of the respective normalized feature vectors and one of the respective transposed feature vectors corresponding to the each of the respective normalized feature vectors, to obtain a cross similarity matrix of the plurality of audio segments, wherein the cross similarity matrix comprises a plurality of rows each representing a class; and
- performing clustering operation based on the cross similarity matrix to obtain a new cross similarity matrix until the new cross similarity matrix meets a clustering termination condition to obtain the clustering result; and
- the performing of the clustering operation comprises:
  - obtain one or more distances for the cross similarity matrix by: for every two rows of the plurality of rows in the cross similarity matrix, calculating one of the one or more distances between the every two rows;
  - determining two ones of the plurality of rows having one of the one or more distances having a smallest value; and
  - merging the determined two ones of the plurality of rows to obtain the new cross similarity matrix.

9. The speech recognition method according to claim 8, wherein the clustering termination condition comprises only two rows remaining in the new cross similarity matrix.

10. The speech recognition method according to claim 1, wherein the obtaining of the second speech recognition result for the speech data comprises:
- associating, for each of one or more speakers, one or more audio segments in the speech data corresponding to the each of one or more speakers with the each of one or more speakers based on the clustering result for the each of at least one of the plurality of speech segments, to obtain the second speech recognition result.

11. An electronic device, comprising:
- a processor; and
- a memory storing a computer program executable by the processor to perform operations comprising:
  - performing speech activity detection on speech data to obtain a plurality of speech segments;
  - determining, for each of the plurality of speech segments, a number of speakers involved in the each of the plurality of speech segments;
  - for each of at least one of the plurality of speech segments with the determined number of speakers greater than 1:
    - performing speech separation on the each of at least one of the plurality of speech segments to obtain a plurality of audio segments;
    - performing speech recognition on each of the plurality of audio segments to obtain respective first speech recognition results for the plurality of audio segments;

performing feature extraction on each of the plurality of audio segments to obtain respective voiceprint feature vectors of the plurality of audio segments; and performing clustering on the plurality of audio segments with respect to the speakers based on the respective voiceprint feature vectors to obtain a clustering result indicating that each of the speakers corresponds to which of the plurality of audio segments; and obtaining a second speech recognition result for the speech data based on the clustering result and the respective first speech recognition results for the each of at least one of the plurality of speech segments.

12. The electronic device according to claim 11, wherein the operations further comprise:

for any one of the plurality of speech segments with the determined number of speakers equal to 1, taking the any one of the plurality of speech segments as an audio segment corresponding to one speaker.

13. The electronic device according to claim 11, wherein the determining of the number of speakers involved in the each of the plurality of speech segments comprises:

using a speaker division model to determine the number of speakers involved in the each of the plurality of speech segments by:
extracting a voiceprint feature and a Mel-scale Frequency Cepstral Coefficients feature from the each of the plurality of speech segments;
encoding the Mel-scale Frequency Cepstral Coefficients feature to obtain an encoded feature vector;
decoding the encoded feature vector to obtain a decoded feature vector;
merging the decoded feature vector and a vector of the voiceprint feature to obtain a prediction feature vector; and
predicting a number of speakers based on the prediction feature vector to obtain the number of speakers involved in the each of the plurality of speech segments.

14. The electronic device according to claim 13, wherein the extracting of the voiceprint feature and the Mel-scale Frequency Cepstral Coefficients feature comprises:

extracting the voiceprint feature from the each of the plurality of speech segments by a voiceprint feature network; and
extracting the Mel-scale Frequency Cepstral Coefficients feature by a Mel-scale Frequency Cepstral Coefficients network.

15. The electronic device according to claim 11, wherein the performing of the speech recognition on each of the plurality of audio segments comprises:

performing the speech recognition on each of the plurality of audio segments by a speech recognition model; and
the speech recognition model is obtained by:
performing augmentation processing on a speech recognition sample to obtain an augmented speech recognition sample, and obtaining a speech recognition training sample comprising the speech recognition sample and the augmented speech recognition sample;
inputting the speech recognition training sample into a first speech recognition model to obtain a sample speech recognition result for the speech recognition training sample;
determining a speech recognition loss value based on the sample speech recognition result and a preset loss function; and in response to determining that the speech recognition loss value is less than or equal to a preset loss threshold, taking the first speech recognition model as the speech recognition model.

16. The electronic device according to claim 15, wherein the performing of the speech separation on the each of at least one of the plurality of speech segments to obtain the plurality of audio segments comprises:

using a speech separation model to perform the speech separation on the each of at least one of the plurality of speech segments to obtain the plurality of audio segments by:
performing short-time Fourier transform on the each of at least one of the plurality of speech segments to obtain a complex spectrum;
performing power-law compression on the complex spectrum to obtain a spectrogram;
performing network coding on the spectrogram to obtain a network coding result;
performing mapping coding on the network coding result to obtain a mapping coding result;
performing first processing on the mapping coding result to obtain predicted phase information and predicted amplitude information of the each of at least one of the plurality of speech segments;
performing second processing on the mapping coding result to obtain a real part and an imaginary part of the each of at least one of the plurality of speech segments;
obtaining an enhanced complex spectrum with an enhanced amplitude based on the predicted phase information, the predicted amplitude information, the real part and the imaginary part; and
performing inverse short-time Fourier transform on the enhanced complex spectrum to obtain the plurality of audio segments.

17. The electronic device according to claim 16, wherein the speech recognition training sample comprises a plurality of audio segments output by the speech separation model.

18. The electronic device according to claim 11, wherein the performing of the clustering on the plurality of audio segments with respect to the speakers based on the respective voiceprint feature vectors to obtain the clustering result comprises:

normalizing each of the respective voiceprint feature vectors to obtain respective normalized feature vectors of the plurality of audio segments;
transposing each of the respective normalized feature vectors to obtain respective transposed feature vectors of the plurality of audio segments;
calculating an inner product of each of the respective normalized feature vectors and one of the respective transposed feature vectors corresponding to the each of the respective normalized feature vectors, to obtain a cross similarity matrix of the plurality of audio segments, wherein the cross similarity matrix comprises a plurality of rows each representing a class; and
performing clustering operation based on the cross similarity matrix to obtain a new cross similarity matrix until the new cross similarity matrix meets a clustering termination condition to obtain the clustering result; and
the performing of the clustering operation comprises:
obtain one or more distances for the cross similarity matrix by: for every two rows of the plurality of rows in the cross similarity matrix, calculating one of the one or more distances between the every two rows;

determining two ones of the plurality of rows having one of the one or more distances having a smallest value; and merging the determined two ones of the plurality of rows to obtain the new cross similarity matrix.

19. The electronic device according to claim 18, wherein the clustering termination condition comprises only two rows remaining in the new cross similarity matrix.

20. A non-transitory computer-readable storage medium storing a computer program executable by a processor to perform operations comprising:

performing speech activity detection on speech data to obtain a plurality of speech segments;

determining, for each of the plurality of speech segments, a number of speakers involved in the each of the plurality of speech segments;

for each of at least one of the plurality of speech segments with the determined number of speakers greater than 1:

performing speech separation on the each of at least one of the plurality of speech segments to obtain a plurality of audio segments;

performing speech recognition on each of the plurality of audio segments to obtain respective first speech recognition results for the plurality of audio segments;

performing feature extraction on each of the plurality of audio segments to obtain respective voiceprint feature vectors of the plurality of audio segments; and performing clustering on the plurality of audio segments with respect to the speakers based on the respective voiceprint feature vectors to obtain a clustering result indicating that each of the speakers corresponds to which of the plurality of audio segments; and obtaining a second speech recognition result for the speech data based on the clustering result and the respective first speech recognition results for the each of at least one of the plurality of speech segments.

* * * * *